May 19, 1936.   J. F. JOY   2,040,852
METHOD FOR THE MANUFACTURE AND REBUILDING OF CUTTER CHAINS
Filed Aug. 16, 1933   2 Sheets-Sheet 2

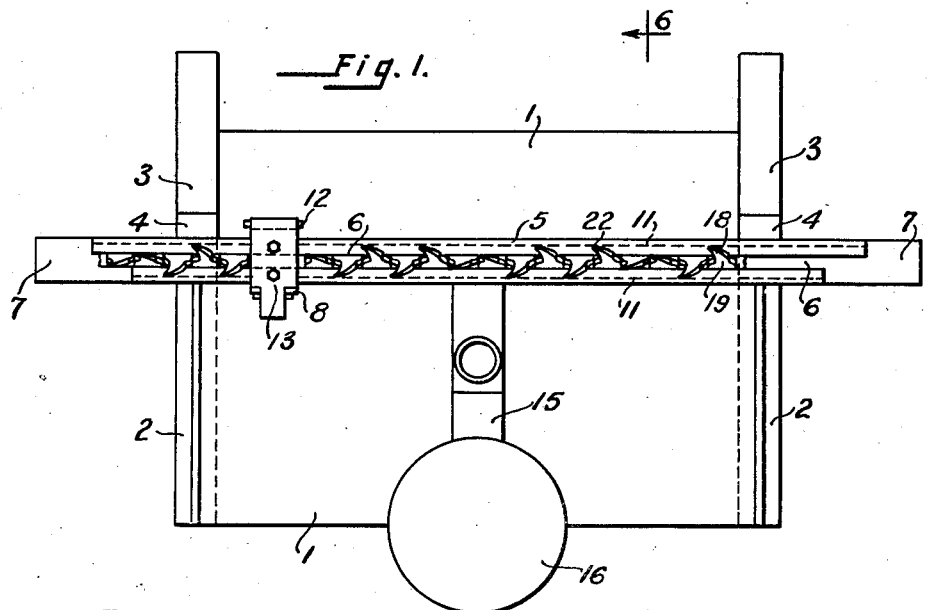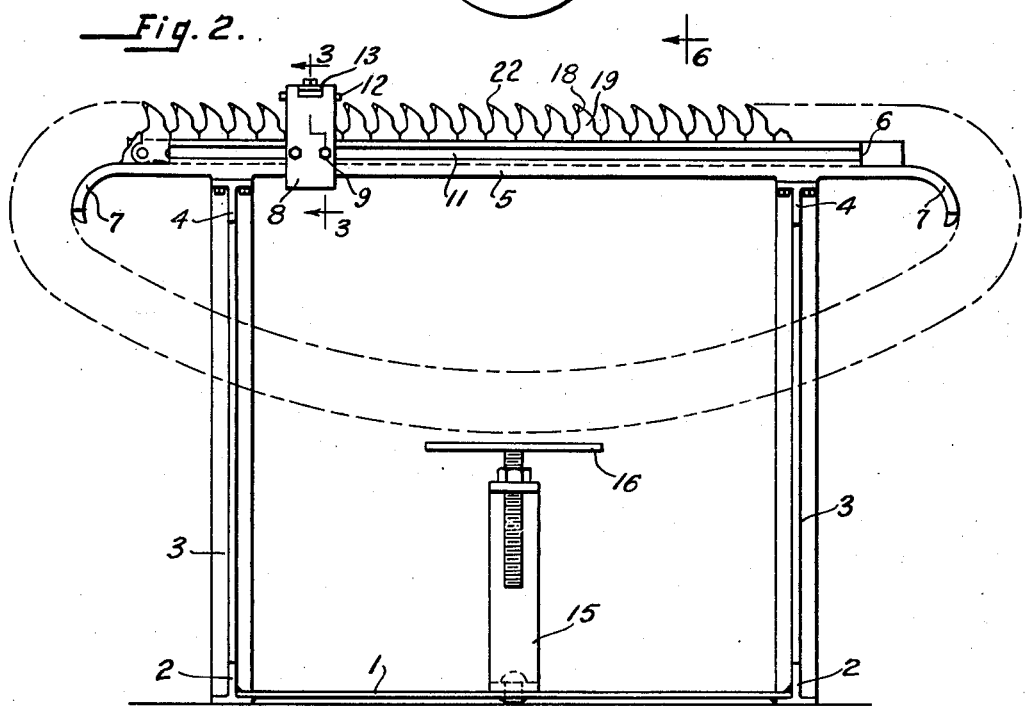

INVENTOR
JOSEPH F. JOY.
BY
ATTORNEYS

Patented May 19, 1936

2,040,852

UNITED STATES PATENT OFFICE 2,040,852

METHOD FOR THE MANUFACTURE AND REBUILDING OF CUTTER CHAINS

Joseph F. Joy, Marion, Ohio, assignor to Sullivan Machinery Company, Chicago, Ill., a corporation of Massachusetts Application August 16, 1933, Serial No. 685,398

5 Claims. (Cl. 76—101)

My invention relates to a method for the manufacture and rebuilding of cutter chains.

It is the object of my invention to provide a method of manufacturing and rebuilding a cutter chain by applying hardened portions to the teeth of the chain after the chain has been assembled and for aligning the angularity of the links of the chain so as to insure the proper position of the hardened cutting surfaces, both during the process of manufacture and the rebuilding of the teeth as they become worn. Other objects of the invention will, however, hereinafter more fully appear.

In the accompanying drawings there is shown for purposes of illustration one form which the invention may assume in practice.

Referring to the drawings:

Figure 1 is a top plan view of the apparatus of my invention;

Figure 2 is a side elevation thereof from the side on which the operator sits;

Figures 3, 4:
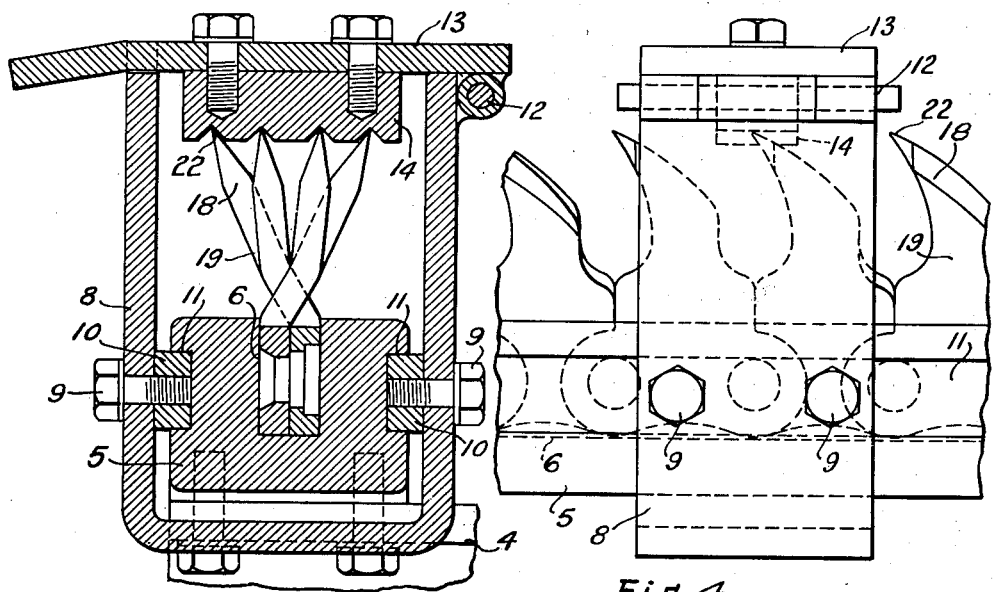
Figure 3 is a section on the line 3—3 of Figure 2.
Figure 4 is a detail side elevation of the template and gauge.

Referring to the drawings in detail, 1 is a platform or floor, to which are connected horizontal braces 2, the ends of which extend upwardly as at 3 to form a base support 4 to which is bolted the guiding trough 5 having a slot 6 for receiving the base of the chain that is being worked upon.

The table 4 is formed with arcuate guiding ends 7 for guiding the chain to and from the table and for supporting it in position on the table.

Mounted on the table for adjustment longitudinally relative thereto is a combined template and gauge comprising a U-shaped frame 8 which is provided with bolts 9 and nuts 10 inserted in grooves 11 in the guiding trough 5. The elements are slidably guided in the longitudinal guiding grooves 11 of the trough 5, thereby to enable adjustment of the gauge and template longitudinally with respect to the table. Hinged to one of the arms 8 as at 12 is a cover plate 13 that has bolted thereto a notched gauge block 14 which acts both as a gauge and as a template for determining and positioning the length of the teeth to insure their uniformity. When one chain tooth has been suitably built up and gauged, the gauge and template may be slid longitudinally into gauging position with respect to the next succeeding tooth.

The base 1 is provided with the seat bracket 15 and an adjustable seat 16 for the operator.

Figures 5, 6:
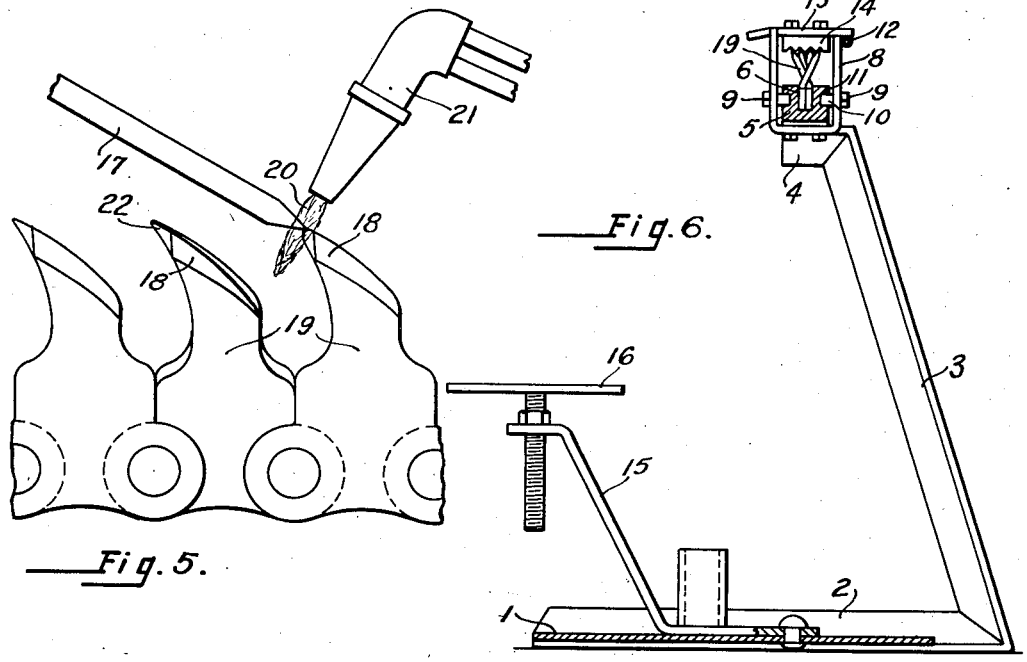
Figure 5 is a detail view of the position of the parts and method of application of the hardening material in building up the hard cutting point on the teeth of the chain.
Figure 6 is a section on the line 6—6 of Figure 1.

This mechanism is used for supporting, aligning and gauging the teeth as they have their tips provided with hard material according to the method shown in Figure 5.

This part of the invention comprises the use of a rod 17 of hard material which is applied to the tip 18 of a tooth 19 in the path of a flame 20 of an oxygen-hydrogen blow-torch 21. The melted hard material is thus transferred from the rod 17 to the tip 18 until the tip is built up into a sharp hard point as at 22. Each tooth is gradually built up step by step by gradual application of hard material to the cutting point until a tooth of substantially the desired shape is attained.

After it is thus built up, it may be gauged by the apparatus heretofore described.

Heretofore, it has been the custom to form the teeth out of hard material which was difficult and expensive and then to grind the teeth to sharp points. This was time-taking, was tedious and was expensive.

By applying the high heat of an oxygen-hydrogen flame to the very hard material which is supplied in a rod and gradually withdrawing the rod until the part of the rod that is transferred to the tooth separates from the rod, I am enabled to provide a quick, cheap and easy means of providing a sharp-pointed, hard-cutting point on each link of the chain comprised of the cutting teeth.

After the cutter chain has been in use for a sufficient time, the pointed tips of the teeth become blunt by wear. When this occurs, the chain may be repointed by welding a rod of the hard tip material to the worn tip under the influence of the oxygen-hydrogen blow torch 21. The rod is then drawn away from the tooth while the point of juncture therebetween is heated to a semi-fluid state until the rod separates from the tooth, leaving a sharp hard point on the tooth at the point of separation from the rod, as previously described. In this way, a worn cutter chain may be quickly and economically renewed.

In order to prevent this operation from providing a temperature that will be sufficient to anneal the temper of the chain or ruin its original heat treatment and thereby decrease its wearing qualities at the pin connections, I provide the welding stand of this invention with a relatively heavy cross section of a chain guide 5 so that the temperature in the body of the link will be removed and the heat dissipated throughout the body of the chain. This is the heat that results in the welding operation at the tip of the teeth.

By this dissipation, the heat does not modify the temper of the rest of the chain. I likewise keep the chain in an upright position for tipping and by sliding the gauge I can maintain a relatively uniform length of tooth.

It will be understood that I desire to comprehend within my invention such modifications as may be necessary to adapt it to varying conditions and uses.

Having thus fully described my invention, what I claim as new and desire to secure by Letters Patent, is:

1. In a method of applying a hardened point of metal to a toothed element of a chain, placing a rod of hard material on the point of the chain element in alignment with the cutting surface thereof, applying a flame at right angles to the axis of the rod at the point of juncture of the rod with the chain element, and gradually withdrawing the hard rod as the end thereof is transferred under the flame to the point of the chain so that the point is built out in line with the cutting edge of the chain element.

2. In a method of forming a pointed cutting tooth for a cutting chain, forming the tooth of relatively soft material with a blunt cutting point and building out the cutting point with a hard-faced tip formed in a sharp point by applying a rod of hard material to the blunt point of the cutting tooth in a hot flame, melting the hard material in the flame, and gradually withdrawing it as the hard material is built up in a point on the end of the tooth whereby a sharp point is formed on the tooth without grinding and of hard material.

3. In a method of manufacturing a sharp-pointed cutting tooth having a point of hard material, forming a blunt pointed cutting tooth of soft material, applying a rod of hard material to the point to be built up, applying a hot flame to that point, and gradually withdrawing the hard rod as this hard material is transferred to the soft cutting tooth until the rod finally separates from the sharp point thus built up.

4. In a method of repointing worn cutter chain teeth, joining a rod of hard material to the worn tooth, and withdrawing said rod away from the tooth while the point of juncture is heated to a semi-fluid state whereby the tooth is provided with a sharp tip of hard material at its point of separation from said rod.

5. In a method of repointing worn cutter chain teeth, applying a rod of hard material to the worn tooth, applying a flame at the point of juncture of the rod with the worn tooth, melting the rod and transferring a portion of it to said tooth, and gradually withdrawing the hard rod away from said tooth until separation occurs, whereby said tooth is provided with a hard sharp tip at its point of separation from the rod.

JOSEPH F. JOY.